Figure 1:
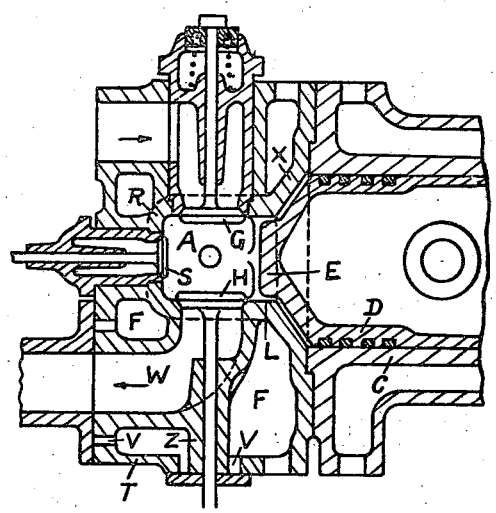

K. I. CROSSLEY AND W. LE P. WEBB.
HORIZONTAL INTERNAL COMBUSTION GAS AND OIL ENGINE.
APPLICATION FILED JUNE 25, 1918.

1,425,946.

Patented Aug. 15, 1922.

INVENTORS:
Kenneth Irwin Crossley
Wilfred Le Plastrier Webb
By Wm Wallace White
ATTY.

K. I. CROSSLEY AND W. LE P. WEBB.
HORIZONTAL INTERNAL COMBUSTION GAS AND OIL ENGINE.
APPLICATION FILED JUNE 25, 1918.

1,425,946.

Patented Aug. 15, 1922.
2 SHEETS—SHEET 2.

INVENTORS:
Kenneth Irwin Crossley
Wilfred Le Plastrier Webb
By
Wm Wallace White
ATTY.

UNITED STATES PATENT OFFICE.

KENNETH IRWIN CROSSLEY AND WILFRED LE PLASTRIER WEBB, OF OPENSHAW, MANCHESTER, ENGLAND.

HORIZONTAL INTERNAL-COMBUSTION GAS AND OIL ENGINE.

1,425,946.    Specification of Letters Patent.    Patented Aug. 15, 1922.

Application filed June 25, 1918. Serial No. 241,878.

*To all whom it may concern:*

Be it known that we, KENNETH IRWIN CROSSLEY and WILFRED LE PLASTRIER WEBB, both subjects of the King of Great Britain, residing at Pottery Lane, Openshaw, Manchester, in the county of Lancaster, England, have invented new and useful Improvements in Horizontal Internal-Combustion Gas and Oil Engines, of which the following is a specification.

Our invention relates to improvements in horizontal internal combustion gas and oil engines.

The object of our invention is to produce an improved construction of combustion chamber for a four cycle internal combustion engine which is more particularly suitable for a horizontal engine and which can be used for either (1) a high compression oil engine in which air only is drawn into the cylinder on the suction stroke and compressed into the combustion chamber to a high compression pressure and temperature on the compression stroke, the oil fuel being injected by itself (and without any separate supply of compressed air for assisting the injection and spraying of the oil fuel) in the form of spray into the compressed and heated air towards the end of the compression stroke, the temperature of the air being raised by the high compression to a sufficient degree to produce ignition the moment the oil is sprayed into it, or (2) a gas engine in which the fuel and air are drawn into the cylinder on the suction stroke the mixture being compressed into the combustion chamber on the compression stroke and ignited by means of an electric spark.

In the construction of the combustion chamber we modify and improve on the one described in our previous British specification No. 29337 of 1912. In this previous specification, which referred only to engines using oil as fuel, a vaporizer was provided but in our present invention and when using the engine as a high compression oil engine and owing to the higher degree of compression used and the resulting higher temperature the oil spray is ignited by the heat of the compression immediately the spray enters the heated air in the combustion chamber and no vaporizer or igniter is therefore necessary (unless it is specially desired to have an alternative means of ignition as a temporary expedient in case of emergency as referred to later) and the combustion chamber is therefore water-jacketed wherever possible. We place the air admission valve at the top, the exhaust valve at the bottom and the oil injector at the side of the combustion chamber (so that the oil may be injected in a direction across or approximately at right angles to the entering air displaced from the cylinder into the combustion chamber) all in a similar manner to that described in our aforesaid specification, but instead of the air and exhaust valves being wide apart as there shown we place them nearer together and about equi-distant from the centre line of the cylinder so that the distance between the valve seats is about equal to half the diameter of the cylinder. This enables us to reduce the capacity of the combustion chamber and so obtain the higher compression desired. The projection on the end of the piston is circular in form as also is the entrance to the combustion chamber from the cylinder and both the projection on the end of the piston and the entrance to the combustion chamber are preferably machined being turned and bored respectively.

When starting a high compression oil engine there may sometimes by chance be an insufficient amount of external force (of compressed air for example if the engine is started by means of compressed air) to enable a powerful turning effort to be given to the engine crankshaft and it might then be necessary to temporarily relieve the compression so much that the temperature of the air at the end of the compression stroke would not be sufficient to ignite the injected oil spray and in view of this we may prefer as a temporary expedient in the case of emergency to make provision at the side of the combustion chamber opposite the sprayer for an electric sparking plug or hot tube igniter as an alternative means of igniting the oil spray charges for a few cycles after the engine is put into motion and until the full compression is used.

We arrange that the distance across the combustion chamber from the oil injector to the opposite side is about the same as the distance between the air admission valve and exhaust valve seats, that is to say about equal to half the diameter of the cylinder. The back and side walls of the combustion chamber are flat or nearly flat when seen in front and side elevation respectively. When seen in plan view the wall at the back of the combustion chamber is in the form of a semi-circle struck from a point at or near the axis of the air admission and exhaust valve spindles.

We usually provide a compressed air starter valve for starting the engine. This is fitted in the back of the combustion chamber on a line axial with the cylinder.

When the combustion chamber is used for a gas engine, a lower compression is used than in the case of the high compression oil engine and this lower compression is obtained by using a piston which is not provided with a projection on its end such as is provided on the high compression oil engine piston. Also an electric sparking plug is fitted in either the aperture provided for the oil injector (which latter is not required in a gas engine) or in the aperture for the oil engine igniter if such an aperture is provided. The gas for combustion is admitted through the air valve at the top of the combustion chamber.

It is desirable in a waterjacketed combustion chamber such as the one described that the inner wall of the chamber which is subject to high temperature and pressure should not be rigidly connected to the outer and cooler water jacket wall more than can be helped owing to the possibilities of fracture due to the stresses set up while the casting is cooling in the foundry combined with the stresses due to temperature and pressure while the engine is working. We therefore in some cases arrange that the oil injector branch, the exhaust port branch, the branch through which the exhaust valve spindle passes, and the igniter branch (if such is used) should be rigidly attached to or cast in one with the inner wall of the combustion chamber but free from or only flexibly connected to the outer or water jacket wall. The air admission valve branch is in any case rigidly connected to both the inner and outer walls. The starter valve branch at the back of the combustion chamber may be freed from the outer wall in cases where the inner and outer walls at the front of the combustion chamber immediately adjoining the cylinder are rigidly joined together, but if the inner and outer walls at the front of the chamber are not rigidly joined together then the air starter valve branch at the back of the combustion chamber may be connected rigidly to both the inner and outer walls.

We prefer the branches for the oil injector and igniter (when the latter is used) to be the same in all respects because this enables the combustion chamber to be not only used either for gas engines or for high compression oil engines but it also enables the combustion chamber to be used for either a right hand or left hand engine or even for an engine with several cylinders in line. In the case of the high compression oil engine the oil injector can then be fitted at either side or in the case of a large engine at both sides of the combustion chamber. A further advantage is that when the combustion chamber is used for a gas engine two electric ignition plugs may be used.

We have illustrated our invention by means of a drawing having four figures, in each of which the same or similar parts are indicated by the same reference letter. Parts which are similar to parts shown in our aforesaid British specification No. 29337 of 1912 are also indicated by the same reference letters as those in that specification.

Figure 2:
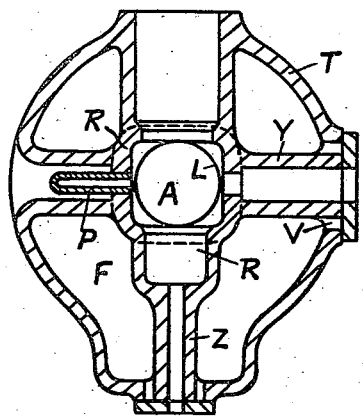
Figure 3:
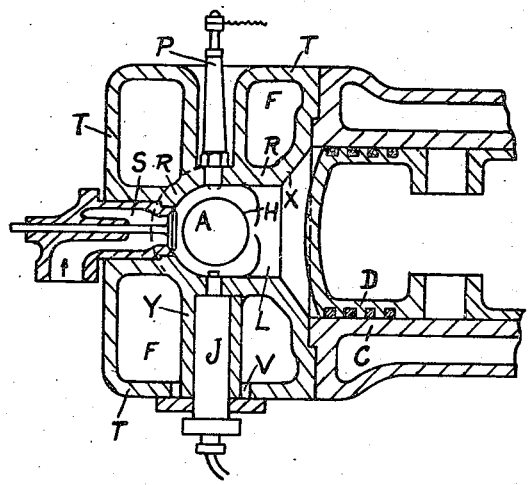
Figure 4:
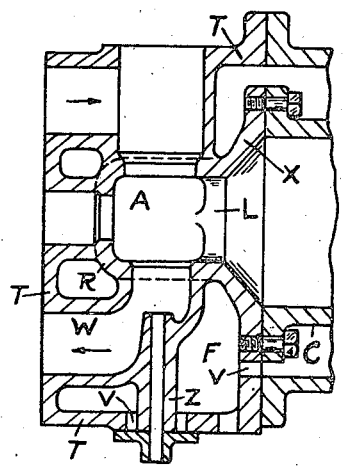

Figure 1 shows a front sectional elevation of the combustion chamber attached to the end of a waterjacketed cylinder of a horizontal engine provided with a piston suitable for the use of oil as fuel. Figure 2 is an end elevation in section of the combustion chamber with the valves and the oil injector removed. Figure 3 is a sectional plan of the combustion chamber and cylinder and provided with a piston suitable for the use of gas as a fuel. Figure 4 is a sectional elevation of the combustion chamber with a modified construction of the front wall and of the outer or water jacket wall.

In these figures the combustion chamber is shown at A the engine cylinder at C and the piston at D. The circular projection on the end of the oil engine piston is shown at E and the circular entrance to the combustion chamber from the cylinder is shown at L. The water jacket is shown at F, the air admission valve at G, the exhaust valve at H, the oil injector at J, the igniter (if one is used) at P, and a compressed air starting valve at S. The inner wall of the combustion chamber is the wall marked R, the outer or water jacket wall being marked T. The space marked V, shows where the exhaust port branch W, the branch Y surrounding the oil injector, the branch Z surrounding the exhaust valve spindle and the front wall X of the combustion chamber are separated or freed from direct rigid connection with the outer wall T.

In Figure 1 the oil engine piston is shown with the circular projection E on its end in the position it occupies at the end of the compression stroke when the said projection has entered the circular entrance L and raised the compression of the air to a high degree. The air admission valve G and exhaust valve H are shown at the top and bottom respectively of the combustion chamber and are at about equal distances from the axial centre line of the cylinder and combustion chamber. The distance across the combustion chamber from the air admission valve to the exhaust valve is about equal to half the diameter of the cylinder C. This enables the compression to be carried much higher if required than in the arrangement described in our previously mentioned specification. The fuel oil is injected in the form of spray through the oil injector J. The heat produced by the compression of the air in the cylinder and combustion chamber is high enough to ignite the oil immediately it is sprayed into the heated air and no separate igniter is therefore necessary. In emergency cases however, such for instance as when no compressed air is available to enable a powerful turning effort to be given when the engine is being started, it is convenient to have an alternative or "stand by" method of ignition and we sometimes make provision for the use of an emergency igniter which may be either an electric starting plug (as shown for instance at P in Figure 3) or a hot ignition tube (such as shown for instance at P in Figure 2) at the side of the combustion chamber opposite to the oil injector or sprayer. The first few ignitions can then be effected by the temporary use of the electric sparking plug (or hot ignition tube) while the engine is being turned by hand or other means and when if required the compression may be temporarily reduced by known means such as the use of a "half compression" cam. After a few ignitions the temporary igniter is put out of action and full compression allowed and the heat of the compression is then sufficient for ignition purposes.

The compressed air starting valve is placed at the back of the combustion chamber on a line axial with the cylinder as shown at S. The back and side portions of the inner wall R. R. of the combustion chamber are flat or nearly flat in the front and end elevation as shown in Figures 1 and 2 respectively. This inner wall when seen in plan is of semi-cylindrical shape at the back of the chamber being struck at a radius from a point at or near the axis of the air admission and exhaust valves as shown in Figure 3. The cross section of the combustion chamber as shown in Figure 2 is rectangular but develops into a circular section when it reaches the entrance L from the cylinder as shown more clearly in Figures 2, 3 and 4.

When the combustion chamber is used for a gas engine the compression is reduced by using a piston which is not provided with a circular projection but with a plain end such as shown in Figure 3. With the gas engine also the electric sparking plug is used as shown in Figure 3 or it may be placed in the aperture provided for the oil injector J (which latter is not used on the gas engine) or two electric sparking plugs may be used one as shown at P in Figure 3 and one in place of the oil injector J. When the engine is arranged as a gas engine both air and gas are drawn into the cylinder on the suction stroke through the admission valve G.

It should be understood that in using the expression "gas" engine we mean an engine in which air and gas (or vapour) are drawn into the cylinder on the suction stroke and the mixture then compressed and ignited at about the end of the compression stroke.

The gas may be of any known kind suitable for use in a gas engine such as town's gas, producer gas, furnace gas, and the gas or vapour of petrol, paraffin, benzol, alcohol and similar fuels.

In Figure 1 the exhaust valve spindle branch Z and exhaust port branch W are shown integral with the inner wall R of the combustion chamber but freed from direct connection with the outer wall T by the space V. V. Similarly in Figures 2 and 3 the branch Y for the oil injector is shown integral with the inner wall R of the combustion chamber but is freed at V from the outer wall T.

In Figures 1 and 3 the front wall X is shown integral with both the inner wall R and the outer wall T. In Figure 4 the front wall X is shown integral with the inner wall R but is freed from the outer wall T by the space V and on this account the exhaust port branch W may be integral with both the inner and outer walls of the combustion chamber as shown. In Figure 1 the space V round the exhaust port branch W allows the branch round the air starter valve S to expand without undue restriction but in some cases it may be desirable to free this branch also.

In Figure 4 where the front wall is integral with the inner wall R but is separated from the outer wall T there is no need to separate the air starter valve branch or the exhaust port branch from the outer wall and they are therefore shown integral with both the inner and outer walls.

In some cases such as in large engines using oil as fuel it may be desirable to inject oil from two opposite sides of the combustion chamber in which case the ignition tube shown in Figure 2 or the electric sparking plug shown in Figure 3 is replaced by a second oil injector similar to the one shown at J in Figure 3. Similarly if desired two electric igniters may be used in the combustion chamber when the latter is used on a gas engine.

A combustion chamber constructed as described can be used at will either for a high compression oil engine or a low compression gas engine, and from a manufacturing point of view this is a considerable advantage.

Further it becomes a very simple matter to convert at any time a high compression oil engine into a low compression gas engine or vice versa.

When this combustion chamber is used on a high compression oil engine the eddying and mixing and scavenging effects are obtained as described and illustrated by streamlines in Figures 2, 3 and 6 respectively of our aforesaid British Specification No. 29337 of 1912.

Having now particularly described our invention, what we claim as new and desire to secure by Letters Patent is:—

1. In combination, a cylinder, a head for the cylinder having a combustion chamber therein in axial alinement with the cylinder, an air intake port and an exhaust port arranged transversely of the chamber and at opposite sides, a fuel injector arranged in the plane of the ports transversely of the axis of the cylinder, and a port at the end of the chamber and in axial alinement with the cylinder for admitting compressed air only for the purpose of starting the engine.

2. In combination, a cylinder, a head for the cylinder having a combustion chamber therein in axial alinement with the cylinder, the cross section of said chamber developing from a rectangular to a circular cross section when it reaches the entrance from the cylinder, an intake port and an exhaust port arranged transversely of the chamber, and a fuel injector arranged in circumferential alinement with the ports at the side of the chamber and transversely of the axis of the cylinder.

3. In combination, a cylinder, a head for the cylinder having a substantially rectangular combustion chamber therein in axial alinement with the cylinder, an air intake port and an exhaust port arranged transversely of the chamber, an igniting device arranged in the plane of the ports and transversely of the axis of the cylinder, and a port at the back of the chamber and in axial alinement with the cylinder for admitting compressed air only for the purpose of starting the engine.

4. In combination, a horizontally disposed cylinder, a head for the cylinder having a substantially rectangular combustion chamber therein in axial alinement with the cylinder, an air intake port at the top of said chamber and an exhaust port at the bottom of said chamber, and a fuel injector arranged in circumferential alignment with the ports at the side of the chamber and transversely of the axis of the cylinder.

In testimony whereof we have signed our names to this specification.

KENNETH IRWIN CROSSLEY.
WILFRED LE PLASTRIER WEBB.

Witnesses:
S. W. GILLETT,
HERBERT ROWLAND ABBEY.